United States Patent
Iyer et al.

(10) Patent No.: US 9,632,790 B2
(45) Date of Patent: Apr. 25, 2017

(54) SELECT LOGIC FOR THE INSTRUCTION SCHEDULER OF A MULTI STRAND OUT-OF-ORDER PROCESSOR BASED ON DELAYED RECONSTRUCTED PROGRAM ORDER

(71) Applicant: Intel Corporation, Santa Clara, CA (US)

(72) Inventors: Jayesh Iyer, Bangalore (IN); Nikolay Kosarev, Yoshkar-Ola (RU); Sergey Y. Shishlov, Moscow (RU); Alexey Y. Sivtsov, Moscow (RU); Yuriy V Baida, Moscow (RU); Alexander V Butuzov, Moscow (RU); Bob Babayan, Moscow (RU); Vladimir Pentkovski, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 13/993,794

(22) PCT Filed: Dec. 26, 2012

(86) PCT No.: PCT/IB2012/003079
§ 371 (c)(1),
(2) Date: Jul. 3, 2014

(87) PCT Pub. No.: WO2014/102563
PCT Pub. Date: Jul. 3, 2014

(65) Prior Publication Data
US 2015/0301831 A1 Oct. 22, 2015

(51) Int. Cl.
*G06F 9/38* (2006.01)

(52) U.S. Cl.
CPC .......... *G06F 9/3836* (2013.01); *G06F 9/3851* (2013.01); *G06F 9/3855* (2013.01)

(58) Field of Classification Search
CPC ..... G06F 9/3836; G06F 9/3851; G06F 9/3855
See application file for complete search history.

(56) References Cited

U.S. PATENT DOCUMENTS 5,765,037 A * 6/1998 Morrison ................ G06F 8/445
712/21
5,859,992 A 1/1999 Tran et al.
6,219,778 B1 4/2001 Panwar et al.
(Continued)

FOREIGN PATENT DOCUMENTS

WO 97/13193 A1 4/1997

OTHER PUBLICATIONS

International search report and written opinion for PCT application No. PCT/IB2012/003079, mailed on Sep. 26, 2013, 6 pages.

*Primary Examiner* — Benjamin Geib
(74) *Attorney, Agent, or Firm* — Lowenstein Sandler LLP (57) ABSTRACT

A processing device comprises select logic to schedule a plurality of instructions for execution. The select logic calculates a reconstructed program order (RPO) value for each of a plurality of instructions that are ready to be scheduled for execution. The select logic creates an ordered list of instructions based on the delayed RPO values, the delayed RPO values comprising the calculated RPO values from a previous execution cycle, and dispatches instructions for scheduling based on the ordered list.

21 Claims, 8 Drawing Sheets

(56) References Cited

U.S. PATENT DOCUMENTS

| | | |
|---|---|---|
| 7,065,635 B1 | 6/2006 | Sugumar et al. |
| 2004/0268335 A1* | 12/2004 | Martin ................ G06F 8/4452 717/161 |
| 2010/0274972 A1 | 10/2010 | Babayan et al. |

* cited by examiner

SELECT LOGIC FOR THE INSTRUCTION SCHEDULER OF A MULTI STRAND OUT-OF-ORDER PROCESSOR BASED ON DELAYED RECONSTRUCTED PROGRAM ORDER

TECHNICAL FIELD

This disclosure relates to the field of processing devices and, in particular, to select logic for an instruction scheduler of a multi-stand out-of-order processor using a reconstructed program order.

BACKGROUND

The performance of contemporary general-purpose superscalar processors, with in-order fetch and out-of-order execution, is limited by utilization of instruction level parallelism (ILP) that characterizes the inherent parallelism of a program algorithm. One of the obstacles to making better use of ILP is the sequential nature of most program code, and the corresponding in-order nature of the instruction fetching. In addition to relying on the out-of-order dispatch and execution capabilities to make use of ILP, certain processors also rely on deeper pipelines, as pipelining allows the processors to make use of ILP.

In such processors, in order to achieve desired performance goals (in terms of instructions per cycle (IPC)), some pieces of logic, which may be referred to as critical loops, evaluate in a single execution cycle or else they could be obstacles to the deeper pipelining described above. One such critical loop includes instruction scheduling logic, which may be made up of wakeup logic and select logic.

Wakeup logic, which includes tracking data dependencies and checking if source operands needed by instructions are available, determines when instructions are ready to be sent for execution. Select logic determines, based on some policy, which of these ready instructions should be sent for execution. Select logic may only be applicable when there are more ready instructions than a number of available execution resources. As an instruction cannot be "qualified as ready" by the wakeup logic until all the instructions which it is dependent on are selected and sent for execution, the wakeup logic and the select logic form a critical loop for performance. In addition, the select logic needs to select the right instructions to schedule to the execution units, such that it could move instructions forward on the critical-path (i.e., wake up the dependent instructions). Thus, for every processor with out-of-order instruction execution, select logic which determines which instruction to select first if there are multiple instructions which are ready to occupy a single execution resource and which fits into the timing budget of single-cycle scheduling loop is important for achieving the desired performance.

The criticality of a one-cycle schedule loop and the importance of the right select logic are also relevant for a multi-strand out-of-order processor, which implements an out-of-order fetching technique (i.e. it is capable of fetching instructions out-of-order from different strands of a multi-strand program representation generated by the compiler). Thus, unlike some conventional processors, which fetch an already ordered sequence of instructions and allocate them to the waiting buffer in-order, a multi-strand out-of-order processor is not aware of the program order of the instructions within a strand with respect to instructions from other strands also allocated in the waiting buffer.

There are many scheduling policies currently used by the select logic in conventional out-of-order processors, such as for example, age-based policies, location-based policies, round robin policies, compiler-aided priority policies, split scheduling window approaches, and select free scheduling. These conventional policies, however, have significant limitations when used with a multi-strand out-of-order processor. For example, an age-based policy that schedules instructions for execution based on when they are allocated is not applicable, since the instructions are allocated out-of-order. Location-based policies and round robin policies, which prioritize instructions based on their location in the waiting buffer, have lower hardware costs but suffer from decreased performance. Select free scheduling, which removes the select logic from the critical path by pipelining select logic into a 1-cycle wakeup loop and a 2-cycle select loop, increases the clock frequency, but at the cost of compromising IPC.

Thus, a select logic scheduling policy is needed that can make use of ILP to achieve higher performance in terms of IPC while still meeting the timing requirements of the critical single-cycle scheduling loop, without growing the complexity of the select logic in a multi-strand out-of-order processor.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for scheduling of instructions in a multi-strand out-of-order processor using a delayed reconstructed program order. In one embodiment, an ordered list of ready to dispatch instructions is created for execution, using a delayed reconstructed program order (RPO) of strands in a multi-strand out-of-order processor. This list may govern the order in which the instructions will be dispatched for execution every cycle. In one embodiment, a delay of a certain number of execution cycles (e.g., 2 or 3 cycles) may be introduced so that the instructions which are dispatched for execution in a given cycles are selected based on the ordered list from several cycles prior. This removes part of the select logic (i.e., the creation of the ordered list) from the critical path, without decreasing performance. This approach may be similar in complexity to prevalent select logic policies (e.g., age-based policies) but leads to better performance (i.e., higher instructions executed per cycle (IPC)) in out-of-order fetching processors.

In one embodiment, the scheduling of instructions in a multi-strand out-of-order processor using a delayed reconstructed program order makes better use of the instruction level parallelism (ILP) that characterizes the inherent parallelism of a program algorithm than other select logic policies. In one embodiment, the policy, by using delayed reconstructed program order value, also optimizes the scheduling (i.e., wakeup and select) loop by removing the part of select logic for creating the ordered list from the critical path of the loop without compromising on IPC performance (as compared to select free scheduling implemented in some out-of-order machines, which optimizes the loop but with a drop in IP performance). In one embodiment, the policy also relieves the compiler from the need to explicitly and statically specify special additional priorities for strands (as compared to policies like "branch path," "chain length," and "maximum dependents," which use compiler support to provide priority information). In addition, the delayed RPO policy adapts instruction scheduling to dynamic situations and allows for the handling of non-deterministic latencies, such as cache misses and delay variations, much better than static schedule policies like "chain-length," "max dependents," and "branch path," which rely totally on the compiler to set priorities. Furthermore, there is no need for separate hardware logic to calculate an executed instruction pointer (EIP), which holds the oldest or minimal program order value among all currently executed strands and is used for ordering the instructions at retirement, as the part of delayed RPO policy (i.e. the creation of the ordered list) can be re-used for this purpose.

Due to the out-of-order fetch capability and strand-based representation of the program code, in one embodiment, the processor is able to achieve a very large instruction window. To be able to fully make use of the ILP and maintain a high sustained execution width, it is essential to be able to select the right strands (and therefore instructions), which might be on the critical path to dispatch from the available ready to dispatch strands in the scheduler.

The strand select algorithm, presented in one embodiment, is responsible for identifying the right strands to dispatch every cycle, which in turn would facilitate the wakeup of dependent instructions and hence could achieve a high sustained execution width of the machine. The algorithm creates an ordered list of ready to dispatch instructions based on the delayed RPO of each strand, which governs the order in which the instructions are dispatched for execution every cycle.

As multi-strand out-of-order processors implement an out-of-order instruction fetching technique, the processor does not normally have information about the program order of an instruction with respect to other instructions in the program algorithm. In one embodiment, the explicit program order information is appended to an instruction in the object code at compilation time. This may be the case only for instructions that would change the state of the system, such as memory instructions (e.g., load or store) or instructions that can cause interrupts. In one embodiment, to save space in the instruction size, only an increment to the actual program order is encoded in the instruction. This may be referred to as the incremental program order (IPO). The compiler guarantees that the program order values are assigned to the instructions within strand strongly in-order, thus forming a progressing sequence of program order values in the strand.

Since the instructions are then allocated out-of-order, in one embodiment, the select logic of the processor reconstructs the actual program order of the strand by adding the IPO encoded in the instruction to the program order (or RPO) of a previously dispatched instruction in the same strand. Each of the entries in a waiting buffer in an instruction scheduling unit (ISU) keeps the RPO of the strand being considered for scheduling, as well as IPOs for calculation of the RPO for the next instruction in the strand. In one embodiment, the waiting buffer can be presented as strand scheduling flops (SSF). The SSF may include a two-level structure where the first level (SSF1) holds non-ready (including newly allocated) instructions for consideration by the wakeup logic and the second level (SSF2) holds the ready instructions and keeps the RPO of these instructions for consideration by the select logic. In another embodiment, the RPO of the strand and IPO encoded in the instruction may be kept in separate buffers and multiplexed separately. A delay buffer may store the updated RPO values for previous cycles, so that the delayed RPO values may be used to create the ordered priority list.

Figure 1:
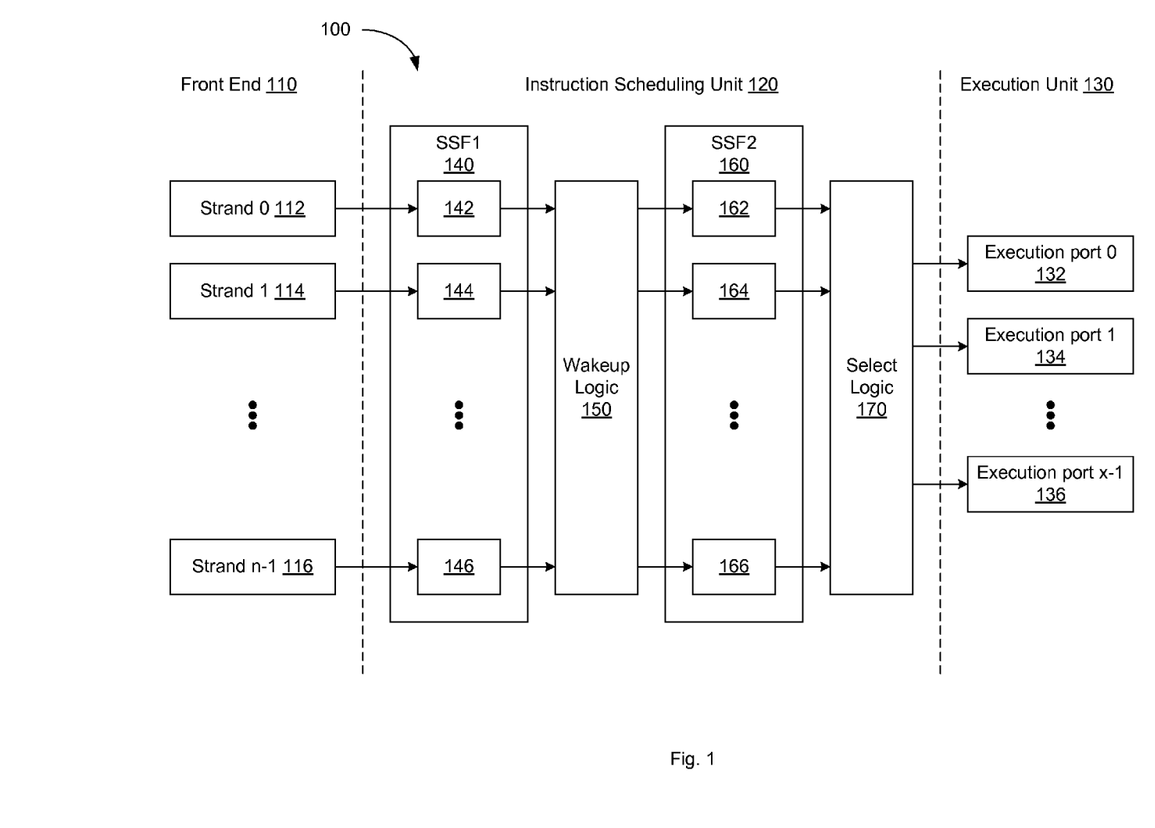
FIG. 1 is a block diagram illustrating an instruction scheduling flow in a multi-strand out-of-order processor using a delayed reconstructed program order, according to an embodiment.

FIG. 1 is a block diagram illustrating an instruction flow through an instruction scheduling unit in a multi-strand out-of-order processor using a delayed reconstructed program order, according to an embodiment. The various modules and components may be described in regards to their roles in scheduling instructions for execution using a delayed reconstructed program order.

Instructions in a multi-strand out-of-order architecture, aided by the compiler at compilation time, may be fetched and grouped in strands. A strand is a sequence of instructions that are predominantly data-dependent upon each other and are executed in-order. But instructions of different strands are mostly independent so multi-strand out-of-order architectures may execute instructions from numerous strands in parallel after resolving any data dependency between them through the wakeup logic. As such, the instructions of a second strand may outrun the instructions of a first strand, if there is no data dependency, even though the location of the first strand instructions may precede the location of second strand instructions in the original source code.

The processor 100 shown in FIG. 1 is logically divided into a front end unit 110, an instruction scheduling unit 120, an execution unit 130 and memory subsystem (not shown in FIG. 1). In one embodiment, the front end unit 110 includes a number of instruction buffers, each corresponding to a particular strand 112, 114, 116. The instruction buffers may be used for receiving fetched instructions. The instruction buffers may be implemented using a queue (e.g., FIFO queue) or any other container-type data structure. Instructions stored in an instruction buffer may be ordered based on an execution or program order. In one embodiment, the processor 100 may be one example of processing device 802, described below with respect to FIG. 8, which operates in a computing system 800.

Given that the instructions in each buffer are associated with one of strands 112, 114, 116, the instructions stored in each buffer may be interdependent. In such embodiments, instructions may be buffered in an execution order that respects the data dependencies among the instructions of the strand and thus executed strongly in-order. For example, a result of executing a first instruction of a strand may be required to evaluate a second instruction of the strand. As such, the first instruction will precede the second instruction in an instruction buffer dedicated for the strand. In such embodiments, an instruction stored in a head of a buffer may be designated as the first or next instruction for dispatch and execution.

In one embodiment, the instruction scheduling unit 120 may receive an instruction from an instruction buffer in one of strands 112, 114, 116, as its input. The instruction scheduling unit 120 may be organized into strand scheduled flops (SSF). The strand scheduled flops may include a two level hardware structure that holds the instructions at the head of each strand when they are allocated to the instruction scheduling unit 120. The SSF may include a first level of hardware entries (i.e., SSF1 140) and a second level of hardware entries (i.e., SSF2 160), for storing instructions. The aforementioned hardware entries may include but are not limited to hardware buffers, flops, or any other hardware resource capable of storing instructions and/or data.

Furthermore, the instruction scheduling unit 120 includes wakeup logic 150 for checking operand readiness of instructions stored in SSF1 140. Wakeup logic, which includes tracking data dependencies and checking if source operands needed by instructions are available, determines when instructions are ready to be sent for execution. Wakeup logic 150 may take as its input, an instruction stored in a first level hardware entry (e.g., 142, 144 or 146) and determine whether the operands for the particular instruction are ready. For example, if a particular instruction is designed to add two operands together to determine a result, the operands must be calculated (possibly by other instructions) before the instruction can be executed. An operation is considered "ready" if all the operations it depends on have been executed. If the instruction is ready, wakeup logic 150 may move the instruction to the corresponding entry (e.g., 162, 164, 166) in SSF2 160, so that the instruction may be considered for execution.

In one embodiment, the instruction scheduling unit 120 may further include select logic 170. Select logic 170 may take as its input one or more instructions stored in SSF2 160 and determine the availability of execution ports for those stored instructions. For example, if there are n strands of instructions and x execution ports, select logic 170 may select up to x out of then stored instructions to designate to the x execution ports 132, 134, 136. Once an execution port is designated as available for an operand-ready instruction stored in SSF2 160, the instruction is dispatched to the execution port. In one embodiment, select logic 170 creates an ordered list of ready to dispatch instructions for execution, using a delayed reconstructed program order of the strands. This list may govern the order in which the instructions are dispatched for execution every cycle. In one embodiment, select logic 170 may introduce a delay of a certain number of execution cycles (e.g., 2 or 3 cycles) so that the instructions which are dispatched for execution in a given cycle are selected based on the ordered list created by processing the reconstructed program order values from several cycles prior. This removes part of the select logic (i.e., the creation of the ordered list) from the critical path, without decreasing the clock frequency. Additional details regarding select logic 170 are provided below.

In one embodiment, execution unit 130 includes a number of execution ports 132, 134, 136, to which operand-ready instructions stored in the instruction scheduling unit 120 are dispatched. Once an instruction is dispatched to an execution port, it is executed and generates its result.

In various embodiments involving a multi-strand out-of-order architecture, certain features as shown in FIG. 1 are dedicated on a per strand basis. In such embodiments, a front-end instruction buffer, a first level hardware entry, an operand check module, and a second level hardware entry may be dedicated for each strand. For example, a first strand 112 may be associated with a dedicated entry 142 in SSF1 and a dedicated entry 162 in SSF2. Accordingly, these features may be used only with respect to instructions of the first strand. Likewise, a second strand 114 may be associated with a dedicated entry 144 in SSF1 and a dedicated entry 164 in SSF2, and so on.

Figure 2:
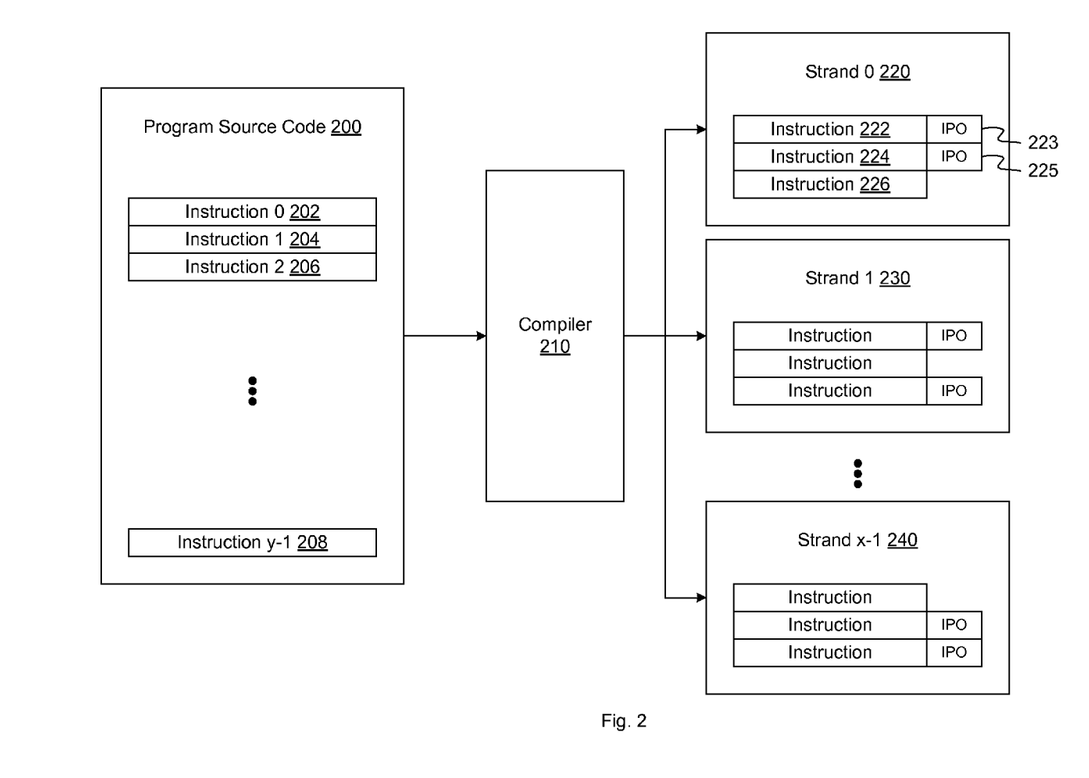
FIG. 2 is a block diagram illustrating a flow for appending program order information to program instructions, according to an embodiment.

FIG. 2 is a block diagram illustrating a flow for appending program order information to program instructions, according to an embodiment. In one embodiment, program source code 200 includes a number of program instructions 202, 204, 206 and 208. The program instructions may be arranged in a defined execution or program order, such that Instruction 0 202 is to be executed before Instructions 1 204, which is to be executed before Instruction 2 206, and so on.

In one embodiment, complier 210 may assign a sequence number named program order (PO), to each of a subset of instructions named program-ordered instructions (PO instructions), which are defined herein as any instructions that access memory data (e.g., a load or a store instruction), as well as any instructions that may cause an interrupt. The program order values are natural numbers assigned in progressive order, but the sequence of values need not be consecutive. For example, one sequence of instructions may include a load, an add, a load, a store, a subtract, a store, and a load. The first load may be assigned a PO value of 1, the second load may be assigned a PO value of 2, the first store a PO value of 4, the second store a PO value of 5, and the third load a PO value of 8. Compiler 210 may then split this sequence of instructions across a plurality of strands 220, 230, 240. The instructions may be divided between strands based on dependencies between the instructions. For example, each instruction that depends on another instruction may be placed in the same strand as the instructions on which it depends. In addition, independent instructions might be distributed among the available strands 220, 230, 240.

In one embodiment, compiler appends an incremental program order (IPO) value to each of the PO instructions (e.g., 222, 224) in each strand. The IPO value (e.g., 223, 225) may not encode the entire PO of an instruction. Instead, the IPO may only encode an increment value that is equal to the difference between the PO value of the instruction for which the PO is being calculated and the PO value of the next PO instruction in the same strand. In one embodiment, the processor hardware reconstructs the PO value for the PO instructions using the IPO value appended to the PO instruction. IPO information need not be encoded for non-PO instructions, such as 226, because PO information is only needed for memory instructions and instructions which may cause an interrupt, in order to maintain the correct order for memory accesses. Thus, arithmetic instructions may not have an IPO value as part of their instruction format. Thus, the compiler 210 may split the program into multiple strands for execution on a multi-strand architecture, while preserving the program order information by attaching the IPO field to each PO instruction.

Figure 3:
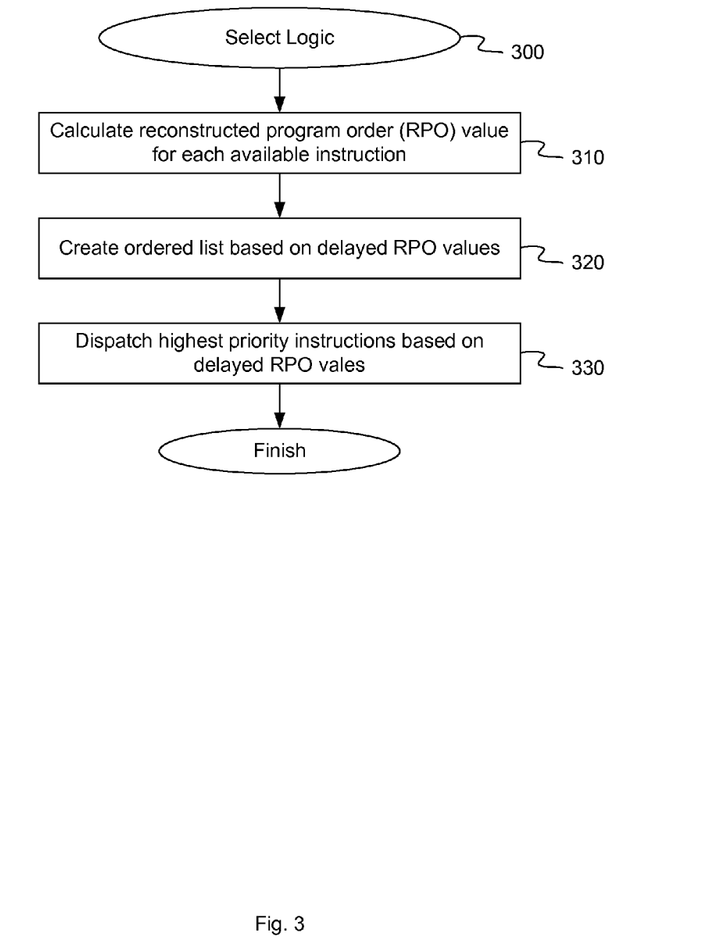
FIG. 3 is a flow diagram illustrating a method for scheduling instructions using a delayed reconstructed program order, according to an embodiment.

FIG. 3 is a flow diagram illustrating a method for scheduling instructions using a delayed reconstructed program order, according to an embodiment. The method 300 may be performed by processing logic that may comprise hardware (e.g., circuitry, dedicated logic, programmable logic, microcode, etc.), software (e.g., instructions run on a processing device to perform hardware simulation), or a combination thereof. The processing logic may dispatch instructions for execution based on an ordered list created from delayed reconstructed program order values. In one embodiment, the method 300 is performed by select logic 170, as shown in FIG. 1.

Referring to FIG. 3, at block 310, method 300 calculates a reconstructed programming order (RPO) value for each ready instruction selected for dispatch. In one embodiment, as described above, wakeup logic 150 wakes up instructions in SSF1 140 and moves the instructions to SSF2 160. Thus, SSF2 160 includes instructions that are ready for scheduling. Each cycle, as a certain number of instructions are dispatched from SSF2 160 by select logic 170, a corresponding number of new instructions are moved into SSF2 to replace those that were dispatched. For each dispatched instruction, select logic 170 may calculate an RPO value. The RPO value may be indicative of the actual (or "real") program order of the instructions. In one embodiment, select logic 170 adds an incremental program order value appended to the instruction, when it is selected for dispatch, to the RPO value of the previously selected instruction from the same strand (which may be stored in a buffer in select logic 170). The result of this operation may be the reconstructed program order (RPO) value of this instruction.

At block 320, method 300 creates an ordered list of instructions based on the delayed RPO values (i.e. delayed RPO values are used to determine which instructions should be dispatched for scheduling). In one embodiment, select logic 170 may create an ordered list of instructions based on the RPO values that were calculated Z cycles (e.g., 2 or 3 cycles) previously. For example, if the RPO values are updated for dispatched instructions in cycle T, those updated RPO values may be used for scheduling instructions Z cycles later. Normally the system would expect that if the RPO is updated in cycle T, the select logic would use this updated RPO to create an ordered list in cycle T+1 (in order to satisfy the 1-cycle schedule). In the delayed RPO approach, however, the updated RPO will be used in the cycle (T+1)+Z. This removes part of the select logic (i.e., the creation of the ordered list based on the RPO values) from the critical path without a significant loss in performance. In one embodiment, the instruction having the oldest RPO value may be given the highest priority.

At block 330, method 300 dispatches the highest priority instructions based on the ordered list of delayed RPO values. In one embodiment, select logic 170 dispatches the instructions with the oldest RPO values to the execution unit 130. For example, if there are five execution ports, then the first five instructions from ordered list may be dispatched.

Figure 4:
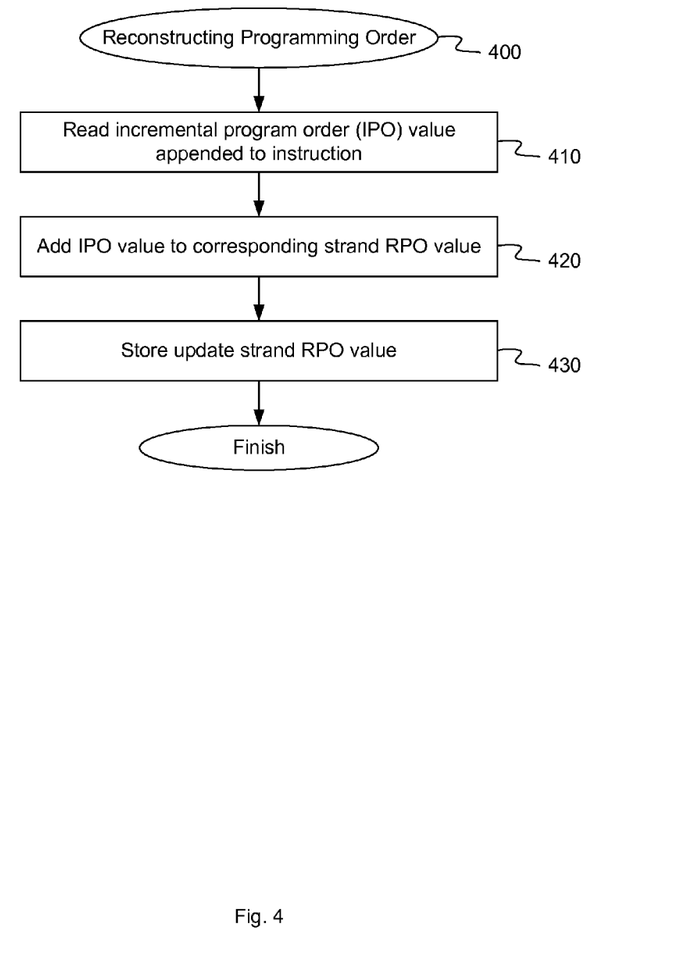
FIG. 4 is a flow diagram illustrating a method for reconstructing a program order, according to an embodiment.

FIG. 4 is a flow diagram illustrating a method for reconstructing a program order, according to an embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. The processing logic may reconstruct the program order of ready instructions in an out-of-order processor. In one embodiment, the method 400 is performed by select logic 170, as shown in FIG. 1, using the hardware arrangement 500 described below with respect to FIG. 5.

Referring to FIG. 4, at block 410, method 400 reads an incremental program order (IPO) value appended to an instruction that is dispatched to execution unit. In one embodiment, SSF2 160 may store a number of entries 162, 164, 166, each of which, if it is a PO instruction, keeps the corresponding IPO value for the instruction. In addition, the RPO value of the strand, which is calculated by the previous instruction dispatched from the same strand, is either kept in the corresponding SSF2 entries or stored in a separate RPO buffer. The IPO value may encode an increment value that is equal to the difference between the RPO value of the previous instruction in the same strand and the RPO value of the instruction to be calculated for which the IPO is encoded. Thus, the IPO value represents the difference between instructions in the real program order that is attributable to the reorganization of the instructions into strands, as described above with respect to FIG. 2.

At block 420, method 400 adds the IPO value to the corresponding strand PO or RPO value. In one embodiment, the PO value for a strand (representing the PO value of the most recently selected instruction from that strand) and the IPO value for the instruction are applied to an arithmetic logic unit (ALU) that adds the IPO value to the PO value (which may also be referred to as RPO value, if previously reconstructed) to form an updated RPO value of the strand. In one embodiment, the PO and IPO may be combined using binary addition. However, other arithmetic operations may alternatively be used depending on how the compiler has calculated the IPOs in relation to the POs.

At block 430, method 400 stores the updated strand RPO value either in the corresponding SSF2 entry or in a separate RPO buffer. Since the newly calculated RPO value at block 420 necessarily represents the most recently dispatched instruction, the updated RPO value may be used as the strand PO value. Thus, the RPO value may be written back to the RPO buffer or stored as the strand PO value in a corresponding entry of SSF2. The updated RPO value may be used to order instructions for scheduling, as will be further described below, and to calculate (i.e., reconstruct) the POs of subsequent instructions in corresponding entries in the waiting buffer. For purposes of illustration, the blocks of FIG. 4 show the process for a single instruction. However, it should be understood that in some implementations, the actions at block 410-430 may be performed for each dispatched instruction in SSF2 in parallel.

Figure 5:
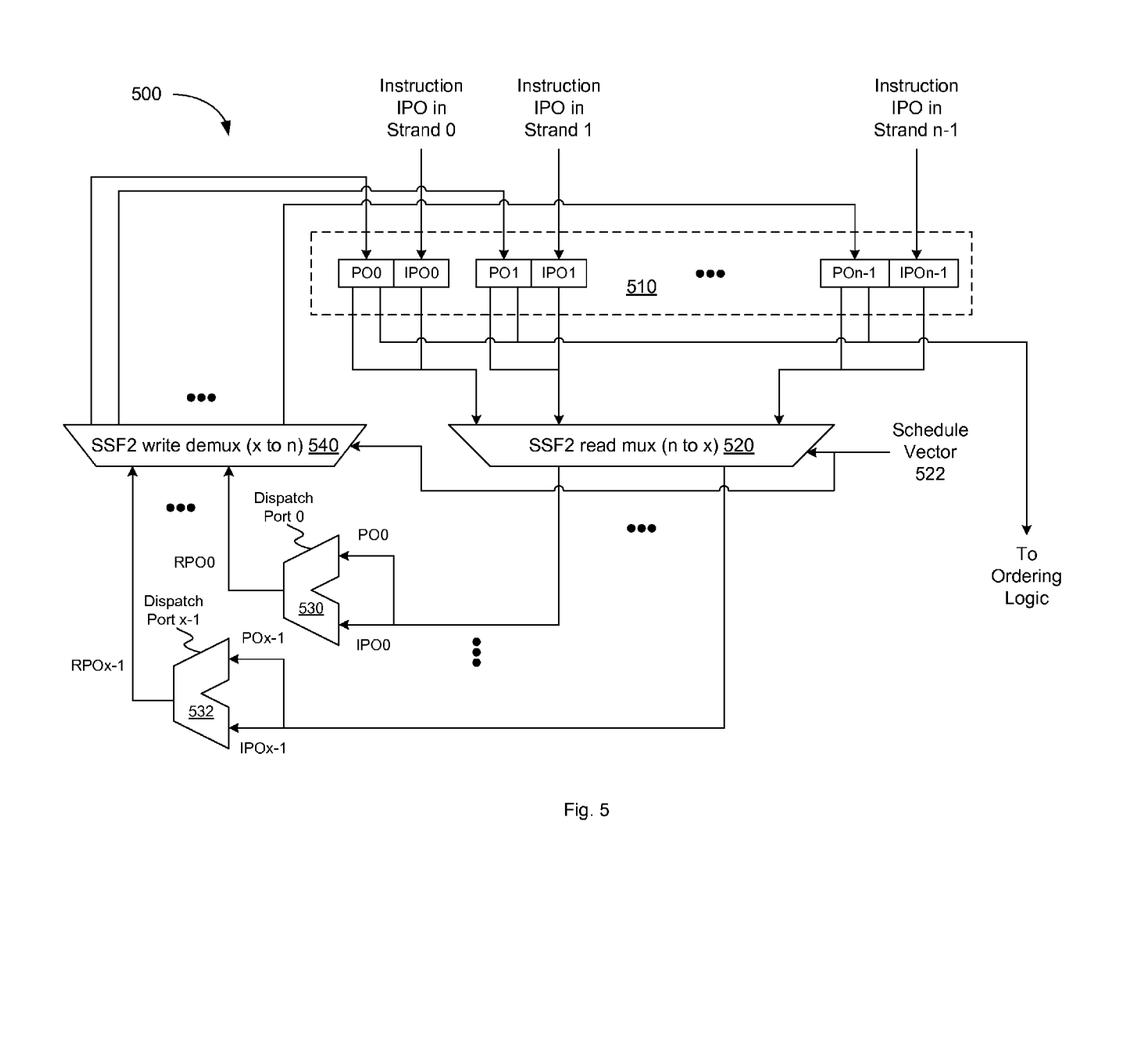
FIG. 5 is a block diagram illustrating a hardware arrangement for reconstructing a program order, according to an embodiment.

FIG. 5 is a block diagram illustrating a hardware arrangement 500 for reconstructing a program order in a multi-strand out-of-order processor, according to an embodiment of the present invention. The arrangement 500 may be implemented as part of an instruction scheduling unit (ISU), such as ISU 120 within a multi-strand out-of-order processor, such as processor 100. Alternatively, the arrangement 500 may be a standalone circuit that communicates with an ISU in a multi-strand out-of-order processor to perform reconstruction of the program order.

The arrangement 500 may include a waiting buffer 510 and logic for program order reconstruction (e.g. program order reconstruction units 530, 532 and a write demultiplexer 540). The waiting buffer 510 may store a number of entries, each of which keeps the program order (PO) of the strand, calculated through dispatched instruction in the previous cycle, being considered for execution, as well as corresponding IPOs for the instructions. The waiting buffer 510 may be analogous to a reservation station in a superscalar processor, in that it allocates every instruction that needs to be executed, with the difference being in the out-of-order allocation. Also in this waiting buffer instructions are de-allocated as soon as they are dispatched for execution. In one embodiment, the waiting buffer is split into two levels and the second level of waiting buffer 510 holds only ready instructions. For PO instructions, each entry of the waiting buffer 510 may comprise a PO-IPO pair that is associated with a head instruction in a strand. For example, if the multi-strand out-of-order processor supports the parallel execution of n strands, the waiting buffer 510 may store up to n PO-IPO pairs. The waiting buffer 510 may output the PO-IPOs to a read multiplexer 520. The entries in the waiting buffer 510 may also correspond to non-PO instructions which, as previously explained, may not include an IPO encoding. In such instances, the waiting buffer 510 entry may only include a PO value for the non-PO instruction, along with a zero or null value in the IPO field. Since the PO value of the next PO instruction in the strand has been calculated by the previous PO instruction (i.e., by adding the IPO of the previous PO instruction dispatched with the strand PO value), the PO value of the next PO instruction in the strand can be set equal to the PO value of non-PO instructions when dispatched. Additionally, in clock cycles when there is no instruction in the waiting buffer 510 for a strand (e.g. the previous instruction has been executed, and the next one has not yet been fetched so that the buffer entry for that strand is empty), the PO field continues to contain the PO of the previous PO instruction, which continues to be used in the calculation of the RPO.

The read multiplexer 520 is part of the select logic and may be implemented as a single (n to x) multiplexer that receives the PO-IPO pairs in the waiting buffer 510. During each execution cycle, the read multiplexer 520 may forward up to x entries out of the possible n entries, based on the instructions selected by the select logic from the ordered list which will be described later, to x number of dispatch ports. The schedule vector 522 is an input into the read multiplexer 120. The schedule vector 522 may be the output from the select logic and may indicate which of the x instructions out of the possible n ready instructions in waiting buffer 150 are selected for dispatch in the current cycle. So the schedule vector 522 controls the x entries to be forwarded from the read multiplexer 520. The number of entries selected as being scheduled for execution in any given clock cycle may vary from cycle to cycle but could be a maximum up to x. In another embodiment, the PO and IPO values may be kept in separate buffers (i.e., the waiting buffer 510 is split into two buffers), so the read multiplexer 520 may be implemented using two buffers, one for dispatching the PO value and one for dispatching the IPO value, but both of these multiplexers would still be controlled by the schedule vector 522 as described above. The selected PO-IPO pairs may be output to the PO reconstruction units 530, 532.

The reconstruction logic may include a number of PO reconstruction units 530, 532, each of which is configured to reconstruct the PO of an instruction coming into the waiting buffer 510, by using a corresponding PO-IPO pair output from the read multiplexer 520. A reconstruction unit 530 may be provided for each of the outputs of the read multiplexer 520 (i.e., x dedicated reconstruction units). In one embodiment, each reconstruction unit 530 may include arithmetic logic that combines the PO and the IPO to form the reconstructed programming order (RPO). In one embodiment, the PO and IPO may be combined using binary addition. However, other arithmetic operations may alternatively be used depending on how the compiler has calculated the IPOs in relation to the POs.

The write demultiplexer 540 may be implemented using one or more multiplexers (e.g., a single x to n multiplexer) that together receive the RPOs from the reconstruction units 530, 532. As with the read multiplexer 520, the write demultiplexer 540 may be controlled by the schedule vector 522 from the ISU. Thus, the write demultiplexer 540 may select, RPO for which x strands out of total n strands need to be updated in the waiting buffer 510. In this manner, a feedback loop is formed in which the POs of previous instructions in the waiting buffer 510 are used to calculate (i.e., reconstruct) the POs of subsequent instructions in corresponding entries in the waiting buffer 510, where the reconstructed POs correspond to the real program order of the PO instructions that have selected to be scheduled for execution in a given cycle.

In one embodiment, the updated PO values which are written back to the waiting buffer 510 (which are equal to the RPO values of strand calculated based on previously dispatched instructions) may ultimately be provided to an ordering logic. One example of the ordering logic is discussed below with respect to FIG. 7. The ordering logic, which is part of the select logic, may compare the RPO values and reorder instructions in an increasing RPO value, resulting in an ordered list. In one embodiment, the ordering logic may implement ordering the instructions by using the RPO values updated a number of cycles prior to the current cycle. For example, the ordering logic may form the ordered list using the RPO values from 2 cycles prior. This ordered list may then be used to prioritize instructions for dispatch to the execution ports. The waiting buffer 510 or the RPO buffer may store the RPO values from prior cycles and those values may be provided directly to the ordering logic.

Figure 6:
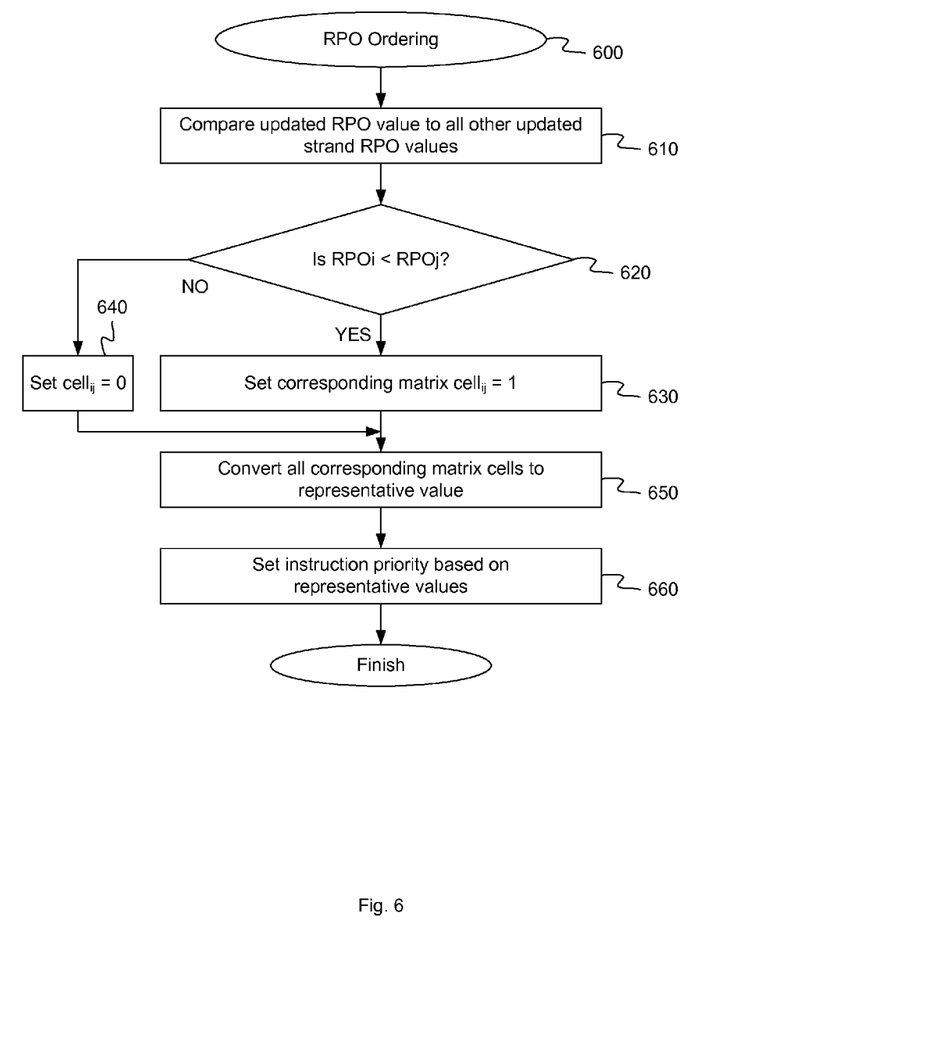
FIG. 6 is a flow diagram illustrating a method for ordering instructions based on the reconstructed program order, according to an embodiment.

FIG. 6 is a flow diagram illustrating a method for ordering instructions based on the reconstructed program order, according to an embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may create an ordered list of instructions based on delayed RPO values associated with the strands. In one embodiment, the method 600 is performed by select logic 170, as shown in FIG. 1, using the system 700 described below with respect to FIG. 7.

Referring to FIG. 6, at block 610, method 600 compares the updated RPO value to all other updated strand RPO values. In one embodiment, the selection logic compares one RPO value to the RPO values for all other strands in parallel. The selection logic may implement a matrix based logic to generate a comparison matrix storing the results of the parallel comparisons.

At block 620, method 600 determines if the updated RPO value (RPOi) is less than the RPO value of all other ready instructions in waiting buffer 510 to which it is currently being compared (RPOj). If RPOi is less than (or equal to) RPOj, at block 630, method 600 sets a corresponding matrix cell ($cell_{ij}$) to a first value (e.g., 1). If RPOi is not less than or equal to RPOj (i.e., RPOi is greater than RPOj), at block 640, method 600 sets the corresponding matrix cell ($cell_{ij}$) to a second value (e.g., 0). In FIG. 6, i is from 0 to n−1 and j is from 0 to n−1, which means RPO value of each entry in waiting buffer is compared in parallel to each of the other entries in waiting buffer.

At block 650, method 600 converts all the matrix cells associated with the updated RPO value (RPOi) to a single representative value. In one embodiment, one's counting logic counts the number of 1's in each row and produces a 4-bit representative value (i.e., from 1111 indicating the instruction with least RPO to 0000 indicating the instruction with highest RPO). In one embodiment, the one's counting logic may be implemented as tree of adders (for each row) operating in parallel.

At block 660, method 600 may order the instructions and set the instruction priority based on the representative values for each instruction. In one embodiment, ordering logic takes each of the 4-bit representative values and orders them in an ordered list based on their value (e.g., 1111 may occupy the highest position in the ordered list, while 0000 occupies the lowest position). This way, the ordered list is created based on increasing RPO value (i.e. oldest ready instruction occupying the first position while the youngest ready instruction in SSF2 occupying the last position). In one embodiment, the ordered list will hold only the representative value (i.e., 4-bit value). The instructions may then be dispatched for execution based on the ordered list.

Figure 7:
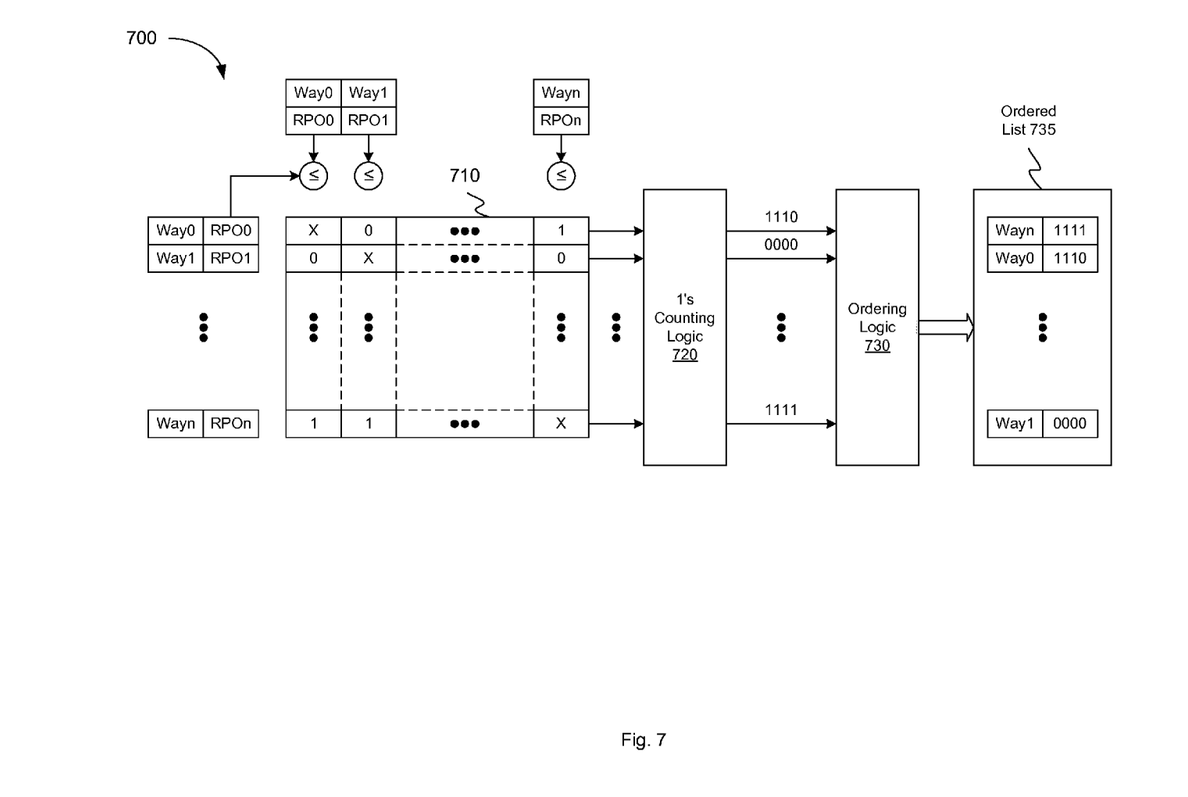
FIG. 7 is a block diagram illustrating a system for ordering instructions based on the reconstructed program order, according to an embodiment.

FIG. 7 is a block diagram illustrating a system for ordering instructions based on the reconstructed program order, according to an embodiment. In one embodiment, the system 700 includes a comparison matrix 710, one's counting logic 720, and ordering logic 730. Comparison matrix 710 may receive as inputs, the updated RPO values calculated as described above. In one embodiment, delayed RPO values are used. For example, if the RPO values are updated for dispatched instructions in cycle T, those updated RPO values may be used for scheduling instructions Z cycles later than expected. Normally the system would expect that if the RPO is updated in cycle T, the select logic would use this updated RPO to create an ordered list in cycle T+1. In the delayed RPO approach, however, the updated RPO will be used in the cycle (T+1)+Z. This removes part of the select logic (i.e., the creation of the ordered list based on the RPO values) from the critical path without a significant loss in performance. The system 700 can use the delay of Z cycles to create the ordered list, as will be described below.

In one embodiment, each RPO value is compared to every each of the other RPO values at the same time. The results of these comparisons may be stored in comparison matrix 710. In one embodiment, there may be n strands where n is equal to 16 (and thus, 16 ready instructions in waiting buffer 510 and 16 strand RPO values for each cycle). As such, comparison matrix 710 may have 16 rows (i=0 to 15) and 16 columns (j=0 to 15). In order to reduce the time taken for all comparisons to be done, all comparisons may be performed in parallel and be implemented by a matrix based logic, where every strand RPO is compared with all other strands RPO in parallel.

In comparison matrix 710, RPOi indicates the RPO of the instruction stored in entry i of SSF2. Each cell of the matrix 710 indicates the result of the comparison of two RPOs. For example, Row 0 has the result for the RPO of strand 0 (RPO0) being compared with RPO of all other strands (strand 0 to 15 indicated by RPO0 to RPO15). The result of each comparison may be a single bit according to a defined condition. In one embodiment, the condition may be defined as if RPOi (where i=0-15)≤RPOj (where j=0-15), then $cell_{ij}=1$. Otherwise, $cell_{ij}=0$. In other embodiments, the condition may be defined in some other manner.

So, in an example using the first strand, RPO0, if RPO0 is lesser than the RPOs of twelve other strands, then row 0 of the matrix will have twelve 1's in it (indicating that instruction of strand 0 is older than the 12 other ready strands in SSF2). This means that in the matrix, there will also be a row with all 1's, indicating that instruction in that way is the oldest amongst the 16 entries of SSF2. In addition, there will also be a row with all 0's, indicating it is the youngest instruction among the 16 entries. If there are two strands with equal RPO values, then the selection logic may choose based on position of the strand (e.g. priority in decreasing way number). Also, the RPO comparison of a way with itself is indicated by an X in the diagram (as no comparison required). In one embodiment, X can be treated as 1. The resulting values in comparison matrix 710 may be provided to one's counting logic 720.

Once the RPO comparison is complete and the comparison matrix 710 is filled, each row of the matrix will have certain number of 1's, which indicates, how many ready instructions in SSF2 are younger than the instruction corresponding to that row. This information may be used to order the instructions based on the RPO values. In one embodiment, one's counting logic 720 counts the number of 1's in each row in parallel and produces a 4-bit representative value (i.e., from 1111 indicating the instruction with least RPO to 0000 indicating the instruction with highest RPO). In one embodiment, the one's counting logic 720 may be implemented as tree of adders (for each row) operating in parallel. Ordering logic 730 then takes each of these 16, 4-bit representative values and orders them in an ordered list 735 based on their value (1111 may occupy the highest position in the ordered list, while 0000 occupies the lowest position). This way, the ordered list is created, based on increasing RPO value (i.e., oldest ready instruction occupying the first position while the youngest ready instruction in SSF2 occupying the last position). In one embodiment, the ordered list 735 will hold only the representative value (i.e., 4-bit value). In one embodiment, the ordering logic 730 may be implemented as 1-to-16 demultiplexer (one for each way to be ordered in the ordered list). In one embodiment, based on the ordered list 735, the instructions may be dispatched for execution. For example, if there are five execution ports, then the first five instructions from ordered list 735 may be dispatched.

Figure 8:
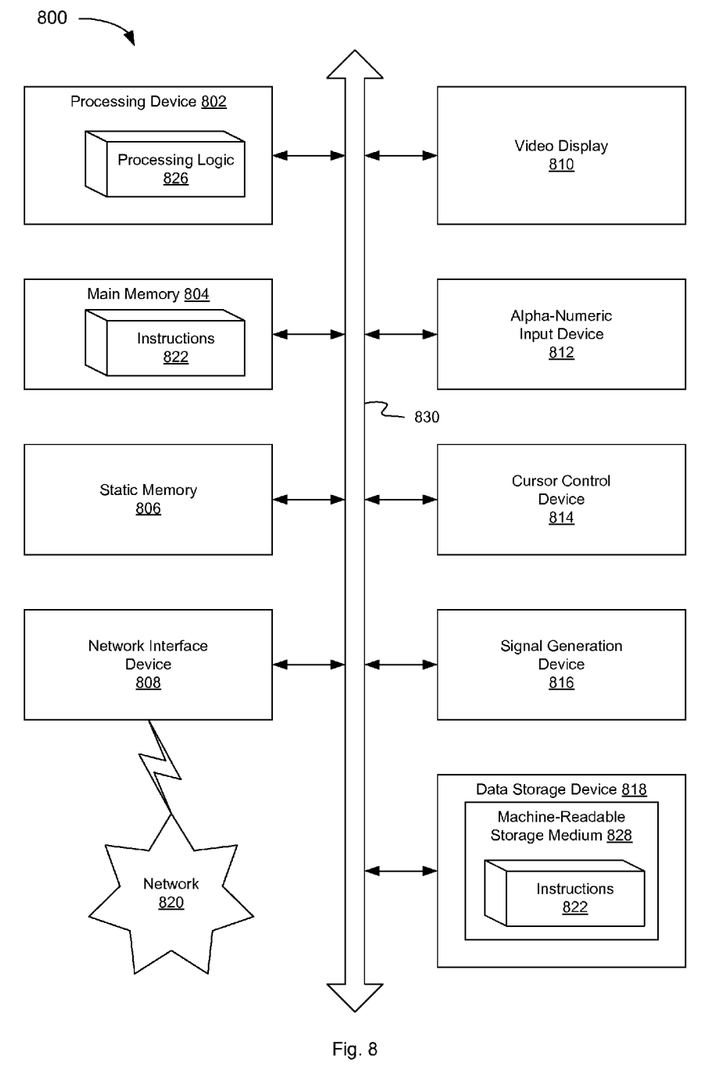
FIG. 8 is a block diagram illustrating a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a computing device, such as a computing device including processor 100.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. The processing device implements a multi-strand architecture which allows out-of-order fetching and execution of instructions arranged by the compiler into multiple strands. The processing device may implement a complex instruction set computing (CISC) architecture, a reduced instruction set computer (RISC) architecture, a very long instruction word (VLIW) architecture, or other instruction sets, or a combination of instruction sets, through translation of binary codes in the abovementioned instruction sets into the multi-strand architecture by a compiler. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-accessible storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-accessible storage media. The instructions 822 may further be transmitted or received over a network 820 via the network interface device 808. In one embodiment, the instructions may be executed in hardware of processing device 802. In other embodiments, however, the instructions may be stored in memory 804 or in storage 818 and executed by software.

The machine-readable storage medium 828 may also be used to store instructions for scheduling instructions in a processor based on a delayed reconstructed processing order, as described herein. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
  calculating, by a processing device, a reconstructed program order (RPO) value for each of a plurality of instructions that are ready to be scheduled for execution;
  creating an ordered list of instructions based on delayed RPO values, the delayed RPO values comprising the calculated RPO values from a previous execution cycle; and
  dispatching instructions for scheduling based on the ordered list.

2. The method of claim 1, wherein calculating the RPO value for each of the plurality of instructions comprises:
  reading an incremental program order (IPO) value appended to each of the plurality of instructions; and
  adding the IPO value to a strand program order value for a processing strand associated with each of the plurality of instructions.

3. The method of claim 2, wherein calculating the RPO value for each of the plurality of instructions further comprises:
  storing the RPO values from each execution cycle in a waiting buffer.

4. The method of claim 2, wherein the IPO values are appended to memory instructions and interruptible instructions by a compiler.

5. The method of claim 1, wherein creating the ordered list based on the delayed RPO values comprises:
  reading the calculated RPO values from the previous execution cycle from a waiting buffer;
  comparing each of the calculated RPO values to all of the other calculated RPO values;
  determining a representative value for each calculated RPO values based on results of the comparing; and
  ordering the representative values to form the ordered list.

6. The method of claim 1, wherein the previous execution cycle comprises an execution cycle that occurred at least two execution cycles prior to a current execution cycle.

7. The method of claim 1, further comprising:
  executing the dispatched instructions on the processing device, wherein the processing device comprises a multi-strand out-of-order processor.

8. A system comprising:
  a memory; and a processing device; communicably coupled to the memory, the processing device comprising select logic to:
calculate a reconstructed program order (RPO) value for each of a plurality of instructions that are ready to be scheduled for execution;
create an ordered list of instructions based on delayed RPO values, the delayed RPO values comprising the calculated RPO values from a previous execution cycle; and
dispatch instructions for scheduling based on the ordered list.

9. The system of claim 8, wherein to calculate the RPO value for each of the plurality of instructions, the select logic to:
read an incremental program order (IPO) value appended to each of the plurality of instructions; and
add the IPO value to a strand program order value for a processing strand associated with each of the plurality of instructions.

10. The system of claim 9, wherein to calculate the RPO value for each of the plurality of instructions, the select logic further to:
store the RPO values from each execution cycle in a waiting buffer.

11. The system of claim 9, wherein the IPO values are appended to memory instructions and interruptible instructions by a compiler.

12. The system of claim 8, wherein to create the ordered list based on the delayed RPO values, the select logic to:
read the calculated RPO values from the previous execution cycle from a waiting buffer;
compare each of the calculated RPO values to all of the other calculated RPO values;
determine a representative value for each calculated RPO values based on results of the comparing; and
order the representative values to form the ordered list.

13. The system of claim 8, wherein the previous execution cycle comprises an execution cycle that occurred at least two execution cycles prior to a current execution cycle.

14. The system of claim 8, wherein the processing device comprises a multi-strand out-of-order processor.

15. A processing device comprising:
an instruction scheduling unit to schedule a plurality of instructions for execution, the instruction scheduling unit comprising:
wakeup logic to resolve dependencies among the plurality of instructions; and
select logic to select a subset of the plurality of instructions for execution by:
calculating a reconstructed program order (RPO) value for each of a plurality of instructions that are ready to be scheduled for execution;
creating an ordered list of instructions based on delayed RPO values, the delayed RPO values comprising the calculated RPO values from a previous execution cycle; and
dispatching instructions for scheduling based on the ordered list; and
an execution unit, communicably coupled to the instruction scheduling unit, to execute the subset of the plurality of instructions.

16. The processing device of claim 15, wherein calculating the RPO value for each of the plurality of instructions comprises:
reading an incremental program order (IPO) value appended to each of the plurality of instructions; and
adding the IPO value to a strand program order value for a processing strand associated with each of the plurality of instructions.

17. The processing device of claim 16, wherein calculating the RPO value for each of the plurality of instructions further comprises:
storing the RPO values from each execution cycle in a waiting buffer.

18. The processing device of claim 16, wherein the IPO values are appended to memory instructions and interruptible instructions by a compiler.

19. The processing device of claim 15, wherein creating the ordered list based on the delayed RPO values comprises:
reading the calculated RPO values from the previous execution cycle from a waiting buffer;
comparing each of the calculated RPO values to all of the other calculated RPO values;
determining a representative value for each calculated RPO values based on results of the comparing; and
ordering the representative values to form the ordered list.

20. The processing device of claim 15, wherein the previous execution cycle comprises an execution cycle that occurred at least two execution cycles prior to a current execution cycle.

21. The processing device of claim 15, wherein the processing device comprises a multi-strand out-of-order processor.

* * * * *